(12) United States Patent
Wampler

(10) Patent No.: US 9,288,967 B1
(45) Date of Patent: Mar. 22, 2016

(54) PET CARE SYSTEMS

(71) Applicant: Sheril A. Wampler, Phoenix, AZ (US)

(72) Inventor: Sheril A. Wampler, Phoenix, AZ (US)

( * ) Notice: Subject to any disclaimer, the term of this patent is extended or adjusted under 35 U.S.C. 154(b) by 0 days.

(21) Appl. No.: 14/249,264

(22) Filed: Apr. 9, 2014

Related U.S. Application Data

(60) Provisional application No. 61/948,718, filed on Mar. 6, 2014.

(51) Int. Cl.
| | | |
|---|---|---|
| *A47B 91/00* | (2006.01) | |
| *A47G 29/00* | (2006.01) | |
| *A01K 5/01* | (2006.01) | |
| *A01K 7/00* | (2006.01) | |

(52) U.S. Cl.
CPC .............. *A01K 5/0114* (2013.01); *A01K 7/00* (2013.01)

(58) Field of Classification Search
CPC ........................ A01K 5/0135; A01K 5/0114
See application file for complete search history.

(56) References Cited

U.S. PATENT DOCUMENTS

| | | | |
|---|---|---|---|
| 1,855,314 A | 4/1932 | Schacht | |
| 3,651,787 A | 3/1972 | Cooper | |
| 4,044,723 A * | 8/1977 | Fitzpatrick | 119/61.5 |
| D270,672 S | 9/1983 | Zelinger | |
| 4,658,759 A | 4/1987 | Brown | |
| 5,501,176 A * | 3/1996 | Tully | 119/61.57 |
| 5,509,376 A | 4/1996 | Tsengas | |
| D374,517 S | 10/1996 | Morrill | |
| 5,560,316 A * | 10/1996 | Lillelund et al. | 119/61.5 |
| D377,244 S | 1/1997 | Steininger | |
| 7,341,019 B1 | 3/2008 | Tsengas | |
| 7,762,211 B1 * | 7/2010 | McDaniel | 119/51.5 |
| D653,001 S | 1/2012 | Tsengas | |
| 2005/0072366 A1 * | 4/2005 | Hammer | 119/61.57 |
| 2005/0115508 A1 | 6/2005 | Little | |
| 2008/0190372 A1 | 8/2008 | Horvath | |
| 2009/0001231 A1 | 1/2009 | Casanova | |
| 2010/0162961 A1 | 7/2010 | Hove et al. | |
| 2010/0300365 A1 | 12/2010 | Weinblatt | |

* cited by examiner

*Primary Examiner* — Amy Sterling
(74) *Attorney, Agent, or Firm* — Lodestar Patents, PLLC; Raymond J. E. Hall

(57) ABSTRACT

A system relating to provide improved food and water delivery to at least two canine pets of at least two different heights. The system elevates the food to a more ideal position for consuming the food and/or water. Moreover, the invention provides storage-assisting (folding) embodiments.

27 Claims, 2 Drawing Sheets

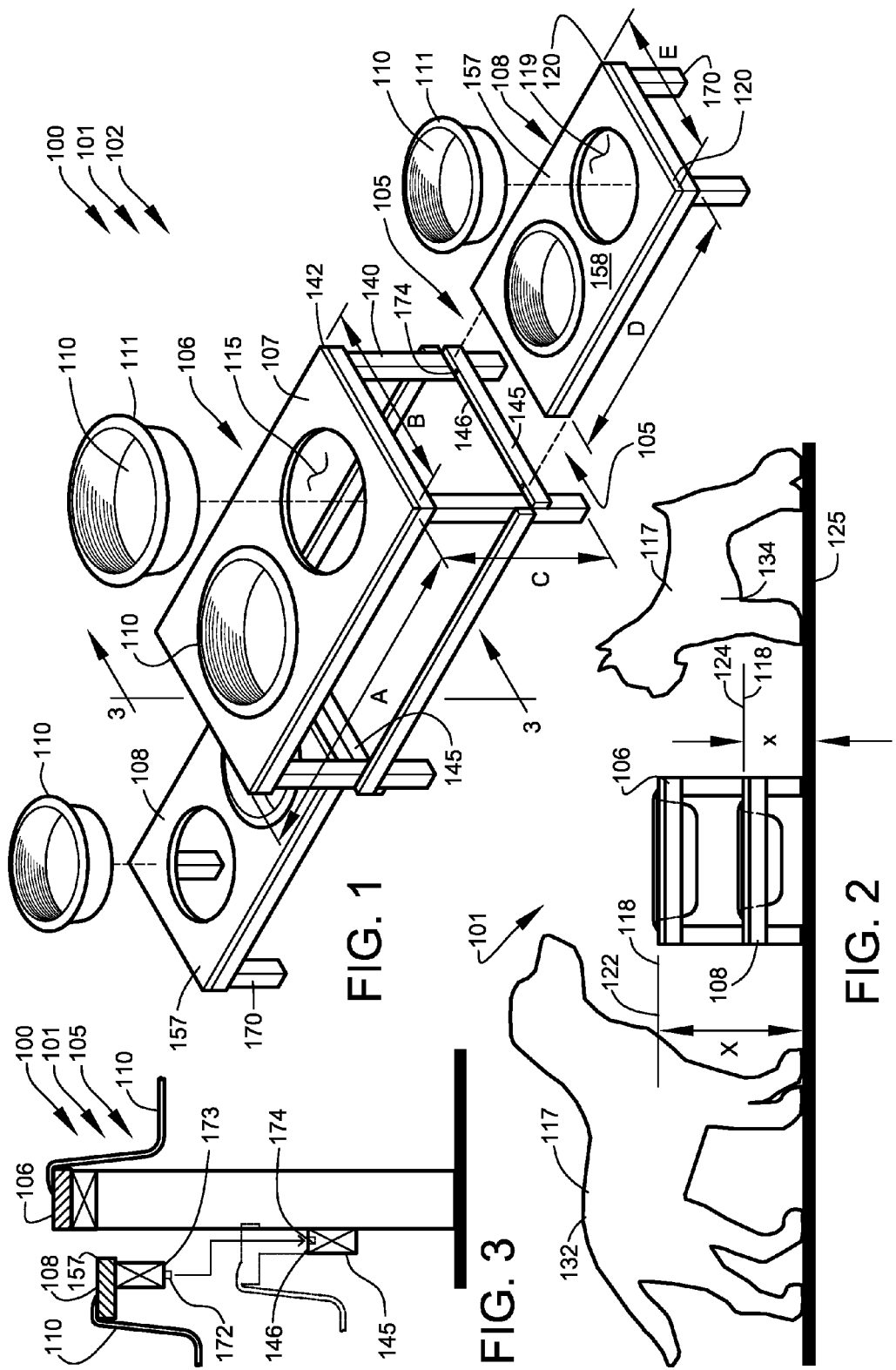

PET CARE SYSTEMS

CROSS-REFERENCE TO RELATED APPLICATION

The present application is related to and claims priority from prior provisional application Ser. No. 61/948,718, filed Mar. 6, 2014, entitled "PET CARE SYSTEMS"; the contents of which are incorporated herein by this reference and are not admitted to be prior art with respect to the present invention by the mention in this cross-reference section.

BACKGROUND

This invention relates to providing a system to improve pet care. More particularly, this invention relates to providing a system to establish an improved means to deliver food and water to a canine pet or other animal.

Veterinarians are now discovering that conventional floor-resting food/water bowls and feeders position most dogs in a non-optimal eating position. A dog or other pet, in a bent-over position, tends to "gulp" their food or water during eating or drinking. Such "gulping" behavior results in an excessive ingestion of air as the food or water is being consumed. This ingestion of air can induce intestinal gas within the pet, which can be discomforting for the pet and owner alike. Moreover, the bent-over position that dogs adopt to eat and drink from a conventional floor-resting arrangement can be physically uncomfortable for them.

OBJECTS AND FEATURES OF THE INVENTION

A primary object and feature of the present invention is to provide a system overcoming the above-mentioned problem(s).

It is a further object and feature of the present invention to provide such a system to establish an improved means to deliver food and water to a canine pet. Another object and feature of the present invention is to provide such a system that elevates the food and water to a position that assists reducing the need of the canine pet to bend over while eating and/or drinking the food and/or water. Yet another object and feature of the present invention is to provide a multiple-unit table that concurrently elevates the food and water to at least two different levels in order to accommodate the heights of at least two canine pets of at least two different heights. Another object and feature of the present invention is to provide a multiple-unit table comprising a central raised table unit that is removably connectable to two lowered table units.

Another object and feature of the present invention is to provide such a system having folding embodiments with hinging components to adjust the height of a table that holds food and water for a canine pet.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to assisting feeding at least one source of nourishment to at least two pets of at least two different heights, comprising: at least one first elevated-supporter structured and arranged to support at least one first portion of the at least one source of nourishment at at least one first elevation above at least one horizontal support surface; wherein such at least one first elevated-supporter comprises at least one first elevated platform structured and arranged to hold such at least one first portion of the at least one source of nourishment; wherein such at least one first elevated-supporter further comprises at least one stable-supporter structured and arranged to support such at least one first elevated platform at such at least one first elevation; and wherein such at least one stable-supporter is further structured and arranged to support such at least one first elevated platform in at least one first substantially parallel position relative to such at least one horizontal support surface; at least one second elevated-supporter structured and arranged to concurrently support at least one second portion of the at least one source of nourishment at at least one second elevation above such at least one horizontal support surface; wherein such at least one second elevated-supporter comprises at least one second elevated platform structured and arranged to hold such at least one second portion of the at least one source of nourishment; wherein such at least one second elevated-supporter further comprises at least one first stable-support-assistor structured and arranged to assist supporting such at least one second elevated platform at such at least one second elevation; and wherein such at least one first stable-support-assistor is further structured and arranged to assist supporting such at least one second elevated platform in at least one second substantially parallel position relative to such at least one horizontal support surface; at least one first connector structured and arranged to removably connect such at least one first elevated-supporter and such at least one second elevated-supporter; wherein such at least one first elevated-supporter further comprises at least one second stable-support-assistor structured and arranged to assist supporting such at least one second elevated platform at such at least one second elevation; and wherein such at least one second stable-support-assistor is further structured and arranged to assist supporting such at least one second elevated platform in such at least one second substantially parallel position; at least one geometry structured and arranged to geometrically position such at least one first elevation at at least one different elevation than such at least one second elevation; wherein such system assists feeding the at least one source of nourishment to at least two pets of at least two different heights.

Moreover, it provides such a system further comprising at least one first container structured and arranged to contain such at least one first portion of the at least one source of nourishment. Additionally, it provides such a system wherein such at least one first elevated platform comprises at least one first container-receiver structured and arranged to removably receive such at least one first container. Also, it provides such a system further comprising at least one second container structured and arranged to contain such at least one second portion of the at least one source of nourishment. In addition, it provides such a system wherein such at least one second elevated platform comprises at least one second container-receiver structured and arranged to removably receive such at least one second container. And, it provides such a system wherein such at least one geometry comprises at least one height-accommodator structured and arranged to accommodate the heights of at least one taller of the at least two pets and at least one shorter of the at least two pets.

Further, it provides such a system wherein such at least one geometry is further structured and arranged to geometrically position such at least one first elevated platform at at least one higher elevation than such at least one second elevated platform. Even further, it provides such a system wherein: such at least one first elevated-supporter accommodates such at least one taller of the at least two pets; and such at least one second elevated-supporter accommodates such at least one shorter of the at least two pets. Moreover, it provides such a system further comprising at least one second connector structured and arranged to removably connect such at least one first elevated-supporter and at least one second such at least one second elevated-supporter. Additionally, it provides such a system wherein such at least one stable-supporter comprises at least one first support column. Also, it provides such a system wherein such at least one first stable-support-assistor comprises at least one second support column. In addition, it provides such a system wherein such at least one second stable-support-assistor comprises at least one elevated support beam. And, it provides such a system wherein such at least one connector comprises: at least one female-type connector; and at least one male-type connector.

Further, it provides such a system wherein: such at least one first elevated-supporter comprises wood; and such at least one second elevated-supporter comprises wood. Even further, it provides such a system wherein: such at least one first container comprises at least one second stainless steel bowl; and such at least one second container comprises at least one second stainless steel bowl.

In accordance with another preferred embodiment hereof, this invention provides a system, relating to assisting feeding at least one source of nourishment to at least one pet, comprising: at least one elevated-supporter structured and arranged to support the at least one source of nourishment at at least one elevation above at least one horizontal support surface; wherein such at least one elevated-supporter comprises at least one platform structured and arranged to hold the at least one source of nourishment; wherein such at least one elevated-supporter comprises at least one stable-supporter structured and arranged to support such at least one platform at such at least one elevation; wherein such at least one stable-supporter is further structured and arranged to support such at least one platform in at least one substantially parallel position relative to such at least one horizontal support surface; wherein such at least one stable-supporter comprises at least one elevated-position-adjuster structured and arranged to adjust such at least one elevated position between at least one higher elevated position and at least one lower elevated position; wherein such at least one elevated-position-adjuster comprises at least one hinge structured and arranged to hinge between such at least one higher elevated position and such at least one lower elevated position; and wherein such system assists feeding the at least one source of nourishment to the at least one pet.

Moreover, it provides such a system further comprising at least one container structured and arranged to contain the at least one source of nourishment. Additionally, it provides such a system wherein such at least one platform comprises at least one container-receiver structured and arranged to removably receive such at least one container. Also, it provides such a system further comprising at least one locker structured and arranged to lock such at least one elevated position in such at least one higher elevated position. In addition, it provides such a system wherein such at least one stable-supporter comprises at least one support column. And, it provides such a system wherein such at least one hinge is centrally-located on such at least one support column.

Further, it provides such a system further comprising: at least one second elevated-supporter structured and arranged to support at least one second portion of the at least one source of nourishment at at least one second elevation above such at least one horizontal support surface; at least one connector structured and arranged to removably connect such at least one elevated-supporter and such at least one second elevated-supporter; and at least one geometry structured and arranged to geometrically position such at least one elevation at at least one different elevation than such at least one second elevation; wherein such at least one elevated-supporter is further structured and arranged to assist supporting such at least one second elevated-supporter at such at least one second elevation. Even further, it provides such a system wherein such at least one elevated-position-adjuster comprises at least one height-accommodator structured and arranged to accommodate the height of the at least one pet. Even further, it provides such a system wherein such at least one elevated-supporter comprises wood. Even further, it provides such a system wherein such at least one container comprises at least one stainless steel bowl.

In accordance with another preferred embodiment hereof, this invention provides a system, relating to assisting feeding at least one source of nourishment to at least two pets of at least two different heights, comprising: at least two containers structured and arranged to contain the at least one source of nourishment; and at least one first table structured and arranged to support at least one first such at least two containers at at least one first elevation above at least one horizontal ground surface supporting the at least two pets; wherein such at least one first table comprises at least one first table top structured and arranged to hold such at least one first such at least two containers; wherein such at least one first table comprises at least four table legs structured and arranged to support such at least one first table top at such at least one first elevation; wherein such at least four table legs are further structured and arranged to support such at least one first table top in at least one first substantially parallel position relative to such at least one horizontal ground surface; and wherein such at least one table top comprises at least one container-receiver structured and arranged to removably receive such at least one first such at least two containers; at least one second table structured and arranged to support at least one second such at least two containers at at least second elevation above such at least one horizontal ground surface; wherein such at least one second table comprises at least one second table top structured and arranged to hold such at least one second such at least two containers; wherein such at least one second table comprises at least two table legs structured and arranged to assist supporting such at least one second table top at such at least one second elevated position; wherein such at least two table legs are further structured and arranged to assist supporting such at least one second table top in at least one second substantially parallel position relative to such at least one horizontal ground surface; wherein such at least one second table top comprises at least one second container-receiver structured and arranged to removably receive such at least one second such at least two containers; wherein such at least one first table comprises at least one elevated support beam structured and arranged to assist supporting such at least one second table top at such at least one second elevated position; and wherein such at least one elevated support beam is further structured and arranged to support such at least one second table top in such at least one second substantially parallel position; at least two connectors structured and arranged to removably connect such at least one first table to at least two such at least one second tables; and at least one geometry structured and arranged to geometrically position such at least one first table top above such at least one second table top; wherein such at least one first table accommodates at least one taller of the at least two pets; wherein such at least one second table accommodates at least one shorter of the at least two pets; and wherein such system assists feeding the at least one source of nourishment to at least two pets of at least two different heights.

In accordance with another preferred embodiment hereof, this invention provides a system, relating to assisting feeding at least one source of nourishment to at least two pets of at least two different heights, comprising: first elevated-supporter means for supporting at least one first portion of the at least one source of nourishment at at least one first elevation above at least one horizontal support surface; wherein such first elevated-supporter means comprises at least one first elevated platform means for holding such at least one first portion of the at least one source of nourishment; wherein such at least one first elevated-supporter means further comprises stable-supporter means for supporting such at least one first elevated platform means at such at least one first elevation; and wherein such stable-supporter means further supports such at least one first elevated platform means in at least one first substantially parallel position relative to such at least one horizontal support surface; second elevated-supporter means for concurrently supporting at least one second portion of the at least one source of nourishment at at least one second elevation above such at least one horizontal support surface; wherein such second elevated-supporter means comprises at least one second elevated platform means for holding such at least one second portion of the at least one source of nourishment; wherein such second elevated-supporter means comprises first stable-support-assistor means for assisting supporting such at least one second elevated platform means at such at least one second elevation; and wherein such first stable-support-assistor means further assists supporting such second elevated platform means in at least one second substantially parallel position relative to such at least one horizontal support surface; connector means for removably connecting such at least one first elevated-supporter means and such at least one second elevated-supporter means; wherein such first elevated-supporter means comprises second stable-support-assistor means for assisting supporting such second elevated platform means at such at least one second elevation; and wherein such second stable-support-assistor means further assists supporting such second elevated platform means in such at least one second substantially parallel position; geometry means for geometrically positioning such at least one first elevation at at least one different elevation than such at least one second elevation; wherein such system assists feeding the at least one source of nourishment to at least two pets of at least two different heights. In addition, this invention provides each and every novel feature, element, combination, step and/or method disclosed by this patent application.

BRIEF DESCRIPTION OF THE DRAWINGS

FIG. 1 shows a perspective view, illustrating a multiple-unit nourishment table of the pet care systems, according to a preferred embodiment of the present invention.

FIG. 2 shows a side view, illustrating the multiple-unit nourishment table in use, according to the preferred embodiment of FIG. 1.

FIG. 3 shows a sectional view through section 3-3 in FIG. 1, illustrating the connection assembly of the multiple-unit nourishment table, according to the preferred embodiment of FIG. 1.

Figure 4:
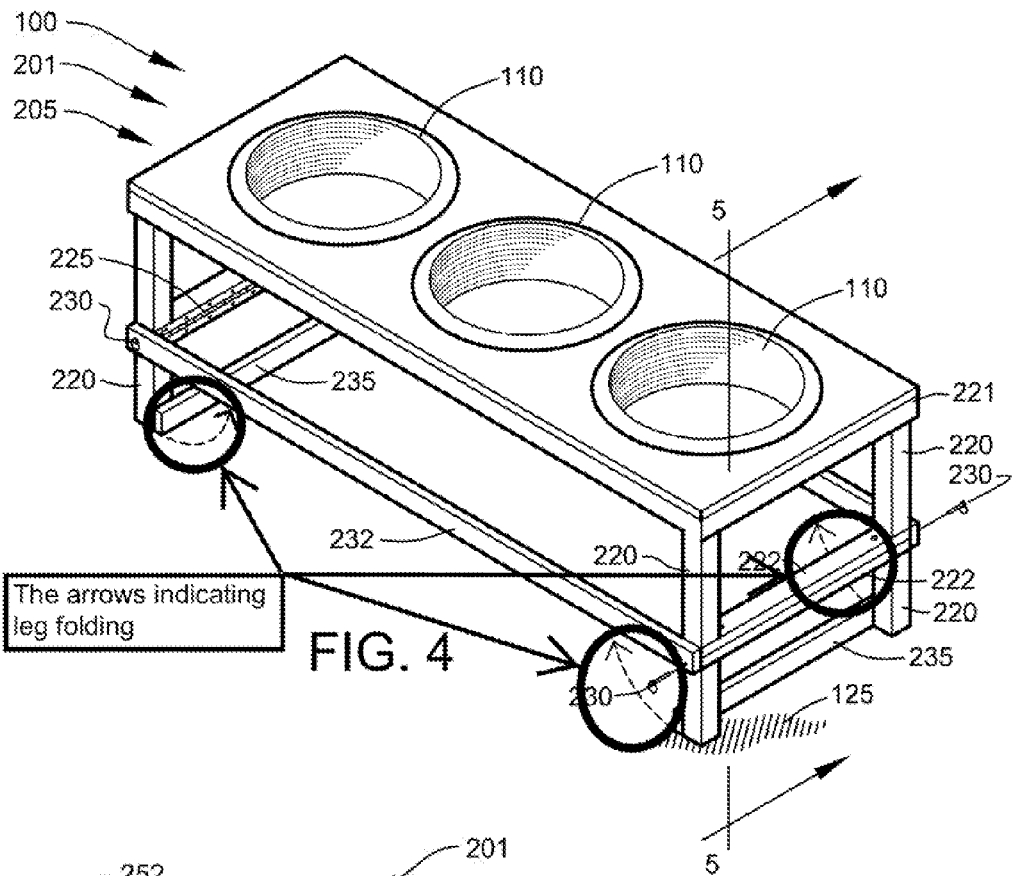
FIG. 4 shows an end view, illustrating a folding nourishment table of the pet care systems, according to another preferred embodiment of the present invention.

DETAILED DESCRIPTION OF THE BEST MODES AND PREFERRED EMBODIMENTS OF THE INVENTION

FIG. 1 shows a perspective view, illustrating multiple-unit nourishment table 101 of pet care systems 100, according to the preferred embodiment of the present invention. FIG. 2 shows a side view, illustrating multiple-unit nourishment table 101 in use, according to the preferred embodiment of FIG. 1. Multiple-unit nourishment table 101 preferably provides an improved means for delivering food and water to at least one pet, preferably at least one canine pet 117, preferably at least two canine pets 117 of at least two different heights, as shown in FIG. 2. Upon reading this specification, those with ordinary skill in the art will now appreciate that, under appropriate circumstances, other types of pets, such as, for example, cats, gerbils, different types of pets, etc., may suffice.

Multiple-unit nourishment table 101 preferably elevates food and water above floor surface 125 to a level that approximately matches leg length X of canine pet 117, as best shown in FIG. 2. Floor surface 125 preferably comprises at least one indoor floor surface, alternately preferably at least one outdoor floor surface.

By elevating the food and water to a level compatible with the height of canine pet 117, multiple-unit nourishment table 101 preferably assists canine pet 117 to assume a healthier and more comfortable eating and drinking position as compared to bent-over positions often required for eating and drinking from floor-resting feeding arrangements. This arrangement preferably further assists preventing ingestion of air that frequently occurs while canine pet 117 bends over to eat and drink from a floor-resting feeding arrangement. Moreover, multiple-unit nourishment table 101 preferably assists maintaining a cleaner feeding area in comparison to floor-resting feeding arrangements by preferably providing a surface for collection of spilt food and water that occurs while canine pet 117 eats and drinks.

Multiple-unit nourishment table 101 preferably supports food and water at at least one elevated position 118, preferably at least two different elevated positions 118 in order to preferably accommodate the heights of at least one taller pet 132 and at least one shorter pet 134, as shown in FIG. 2. Multiple-unit nourishment table 101 preferably concurrently supports the food and/or water at at least one higher elevated position 122 and at least one lower elevated position 124 in order to preferably accommodate the heights of taller pet 132 and shorter pet 134, respectively, as best shown in FIG. 2. Upon reading this specification, those with ordinary skill in the art will now appreciate that, under appropriate circumstances, considering such issues as design preference, manufacturing preferences, user preferences, cost, changing needs, user need, pet type, etc., other elevation arrangements, such as, for example, more than two raised positions to accommodate more than two pets, adjustable elevation arrangements, user-customized elevation arrangements, etc., may suffice.

Multiple-unit nourishment table 101 preferably comprises at least one central raised table 106, as best shown in FIG. 1.

Multiple-unit nourishment table 101 preferably further comprises at least one lowered side table 108, preferably at least two lowered side tables 108, as shown in FIG. 1. Central raised table 106 (at least embodying herein at least one first elevated-supporter structured and arranged to support at least one first portion of the at least one source of nourishment at at least one first elevation above at least one horizontal support surface; and at least embodying herein at least one first table structured and arranged to support at least one first such at least two containers at at least one first elevation above at least one horizontal ground surface supporting the at least two pets; and at least embodying herein first elevated-supporter means for supporting at least one first portion of the at least one source of nourishment at at least one first elevation above at least one horizontal support surface) preferably is structured and arranged to accommodate the height of taller pet 132 by preferably holding food and water at higher elevated position 122, as shown in FIG. 2. Lowered side table 108 (at least embodying herein at least one second elevated-supporter structured and arranged to concurrently support at least one second portion of the at least one source of nourishment at at least one second elevation above such at least one horizontal support surface; and at least embodying herein at least one second table structured and arranged to support at least one second such at least two containers at at least second elevation above such at least one horizontal ground surface; and at least embodying herein second elevated-supporter means for concurrently supporting at least one second portion of the at least one source of nourishment at at least one second elevation above such at least one horizontal support surface) preferably is structured and arranged to accommodate the height of shorter pet 134 by preferably holding food and water at lower elevated position 124, as shown. The above described arrangement at least embodies herein at least one geometry structured and arranged to geometrically position such at least one first elevation at at least one different elevation than such at least one second elevation; and at least embodies herein geometry means for geometrically positioning such at least one first elevation at at least one different elevation than such at least one second elevation; and at least herein embodies wherein such at least one geometry comprises at least one height-accommodator structured and arranged to accommodate the heights of at least one taller of the at least two pets and at least one shorter of the at least two pets; and at least herein embodies wherein such at least one geometry is further structured and arranged to geometrically position such at least one first elevated platform at at least one higher elevation than such at least one second elevated platform.

Lowered side tables 108 preferably are removably attachable to central raised table 106, as shown (see FIG. 3 and further details below). Central raised table 106 preferably is structured and arranged to connect to one or two lowered side tables 108, as shown (see further details below). Multiple-unit nourishment table 101 preferably permits the user to assemble the desired number of lowered side tables 108 (one or two) on central raised table 106, as shown. In complete assembly 102, central raised table 106 preferably is connected to two lowered side tables 108 and central raised table 106 preferably is centrally located with respect to lowered side tables 108, as best shown in FIG. 1. Upon reading this specification, those with ordinary skill in the art will now appreciate that, under appropriate circumstances, considering such issues as design preference, manufacturing preferences, user preferences, cost, changing needs, user need, pet type, etc., other table arrangements, such as, for example, lowered tables centrally located, different arrangements of tables with respect to each other, more than two elevation positions, non-removable side tables, etc., may suffice.

Multiple-unit nourishment table 101 preferably is structured and arranged to hold at least two bowls 110, preferably at least one plurality of bowls 110, as shown in FIG. 1. Bowls 110 (at least embodying herein at least one first container structured and arranged to contain such at least one first portion of the at least one source of nourishment; and at least embodying herein at least two containers structured and arranged to contain the at least one source of nourishment; and at least embodying herein at least one second container structured and arranged to contain such at least one second portion of the at least one source of nourishment) preferably hold food and/or water for nourishing canine pet 117. Central raised table 106 preferably holds at least one bowl 110, preferably two bowls 110, as shown in FIG. 1. Each lowered side table 108 preferably holds at least one bowl 110, preferably two bowls 110, as shown. Upon reading this specification, those with ordinary skill in the art will now appreciate that, under appropriate circumstances, considering such issues as design preference, manufacturing preferences, user preferences, cost, changing needs, user need, pet type, etc., other bowl arrangements, such as, for example, supports for more than two bowls on each table, supports for one bowl on each table, etc., may suffice.

Central raised table 106 preferably comprises at least one platform 107, as shown. Platform 107 (at least herein embodying wherein such at least one first elevated-supporter comprises at least one first elevated platform structured and arranged to hold such at least one first portion of the at least one source of nourishment; and at least herein embodying wherein such at least one first table comprises at least one first table top structured and arranged to hold such at least one first such at least two containers; and at least herein embodying wherein such first elevated-supporter means comprises at least one first elevated platform means for holding such at least one first portion of the at least one source of nourishment) preferably comprises a rectangular shape, as shown. Platform 107 preferably comprises at least one bowl-receiver 115, preferably at least two bowl-receivers 115, as best shown in FIG. 1. Bowl-receiver 115 (at least herein embodying wherein such at least one first elevated platform comprises at least one first container-receiver structured and arranged to removably receive such at least one first container) preferably comprises at least one circular aperture structured and arranged to preferably receive and preferably retain bowl 110, as shown. Bowl-receiver 115 preferably is structured and arranged to preferably retain bowl 110 by preferably holding bowl lip 111 at higher elevated position 122, as shown. Bowls 110 preferably are removable from central raised table 106, as shown. Upon reading this specification, those with ordinary skill in the art will now appreciate that, under appropriate circumstances, considering such issues as design preference, manufacturing preferences, user preferences, cost, changing needs, user need, bowl type, etc., other platform arrangements, such as, for example, other receiving aperture shapes, non-removable bowls, other platform shapes, etc., may suffice.

Central raised table 106 preferably comprises at least one support leg 140, preferably four support legs 140, as shown. Each such support leg 140 preferably is located approximately at each corner 142 of platform 107, as shown. Support legs 140 preferably supports platform 107 above floor surface 125, as shown. Support legs 140 (at least herein embodying wherein such at least one first elevated-supporter further comprises at least one stable-supporter structured and arranged to support such at least one first elevated platform at such at least one first elevation; and at least herein embodying wherein such at least one first elevated-supporter means further comprises stable-supporter means for supporting such at least one first elevated platform means at such at least one first elevation; and at least herein embodying wherein such at least one first table comprises at least four table legs structured and arranged to support such at least one first table top at such at least one first elevation) preferably elevates platform 107 to higher elevated position 122, as shown. Support legs 140 preferably further holds platform 107 at least substantially parallel to floor surface 125, as shown (this arrangement at least herein embodying wherein such at least one stable-supporter is further structured and arranged to support such at least one first elevated platform in at least one first substantially parallel position relative to such at least one horizontal support surface; and this arrangement at least herein embodying wherein such stable-supporter means further supports such at least one first elevated platform means in at least one first substantially parallel position relative to such at least one horizontal support surface). Upon reading this specification, those with ordinary skill in the art will now appreciate that, under appropriate circumstances, considering such issues as design preference, manufacturing preferences, user preferences, cost, changing needs, user needs, etc., other support arrangements, such as, for example, other numbers of support legs, other support leg shapes, other support leg positions, etc., may suffice.

Central raised table 106 preferably comprises at least one elevated support bar 145, preferably two elevated support bars 145, as shown. Each elevated support bar 145 (at least herein embodying wherein such at least one first elevated-supporter comprises at least one second stable-support-assistor structured and arranged to assist supporting such at least one second elevated platform at such at least one second elevation; and at least herein embodying wherein such first elevated-supporter means comprises second stable-support-assistor means for assisting supporting such second elevated platform means at such at least one second elevation; and at least herein embodying wherein such at least one first table comprises at least one elevated support beam structured and arranged to assist supporting such at least one second table top at such at least one second elevated position) preferably functions to assist supporting each lowered side table 108 at lowered elevated position 124, as shown (see further details below). Upon reading this specification, those with ordinary skill in the art will now appreciate that, under appropriate circumstances, considering such issues as design preference, manufacturing preferences, user preferences, cost, changing needs, user needs, etc., other support-assisting arrangements may suffice.

Each lowered side table 108 preferably comprises at least one platform 157, as shown. Platform 157 preferably comprises a rectangular shape, as shown. Platform 157 (at least herein embodying wherein such at least one second elevated-supporter comprises at least one second elevated platform structured and arranged to hold such at least one second portion of the at least one source of nourishment; and at least herein embodying wherein such second elevated-supporter means comprises at least one second elevated platform means for holding such at least one second portion of the at least one source of nourishment; and at least herein embodying wherein such at least one second table comprises at least one second table top structured and arranged to hold such at least one second such at least two containers) preferably comprises at least one bowl-receiver 119, preferably two bowl-receivers 119, as shown. Bowl-receiver 119 preferably comprises at least one circular aperture structured and arranged to preferably receive and preferably retain bowl 110, as shown. Bowl-receiver 119 (at least herein embodying wherein such at least one second elevated platform comprises at least one second container-receiver structured and arranged to removably receive such at least one second container) preferably is structured and arranged to preferably retain bowl 110 by preferably holding bowl lip 111 at lower elevated position 124, as shown. Bowls 110 preferably are removable from lowered side tables 108, as shown. Upon reading this specification, those with ordinary skill in the art will now appreciate that, under appropriate circumstances, considering such issues as design preference, manufacturing preferences, user preferences, cost, changing needs, user need, bowl type, etc., other platform arrangements, such as, for example, other receiving aperture shapes, non-removable bowls, other platform shapes, etc., may suffice.

Lowered side table 108 preferably comprises at least one support leg 170, preferably two support legs 170 (at least herein embodying wherein such at least one second table comprises at least two table legs structured and arranged to assist supporting such at least one second table top at such at least one second elevated position), as best shown in FIG. 1. Each support leg 170 preferably is approximately located at outer corners 120 of platform 157, as shown. Support legs 170 (at least herein embodying wherein such at least one second elevated-supporter comprises at least one first stable-support-assistor structured and arranged to assist supporting such at least one second elevated platform at such at least one second elevation; and at least herein embodying wherein such second elevated-supporter means comprises first stable-support-assistor means for assisting supporting such at least one second elevated platform means at such at least one second elevation; and at least herein embodying wherein such at least one second stable-support-assistor is further structured and arranged to assist supporting such at least one second elevated platform in such at least one second substantially parallel position) preferably cooperate with elevated support bar 145 to preferably elevate platform 157 to lower elevated position 124 with platform 157 preferably at least substantially parallel to floor surface 125, as shown (this arrangement at least herein embodying wherein such at least one first stable-support-assistor is further structured and arranged to assist supporting such at least one second elevated platform in at least one second substantially parallel position relative to such at least one horizontal support surface; and this arrangement at least herein embodying wherein such first stable-support-assistor means further assists supporting such second elevated platform means in at least one second substantially parallel position relative to such at least one horizontal support surface). Upon reading this specification, those with ordinary skill in the art will now appreciate that, under appropriate circumstances, considering such issues as design preference, manufacturing preferences, user preferences, cost, changing needs, user needs, etc., other support arrangements, such as, for example, other numbers of support legs, other support leg shapes, etc., may suffice. Upon reading this specification, those with ordinary skill in the art will now appreciate that, under appropriate circumstances, considering such issues as design preference, manufacturing preferences, user preferences, cost, changing needs, user needs, etc., other support assisting arrangements may suffice.

Central raised table 106 preferably is self-supporting with support legs 140, as shown. Lowered side table 108 preferably requires the assistance of elevated support bar 145 to maintain the elevation of platform 157 at lower elevated position 124, as shown. Upon reading this specification, those with ordinary skill in the art will now appreciate that, under appropriate circumstances, considering such issues as design preference, manufacturing preferences, user preferences, cost, changing needs, user needs, etc., other side table support arrangements, such as, for example, self-supporting side tables, etc., may suffice.

FIG. 3 shows a sectional view through the section 3-3 in FIG. 1, illustrating connection assembly 105 of multiple-unit nourishment table 101, according to the preferred embodiment of FIG. 1. Each lowered side table 108 preferably connects to central raised table 108 by the operation of at least one connection assembly 105 (at least embodying herein at least one first connector structured and arranged to removably connect such at least one first elevated-supporter and such at least one second elevated-supporter; and at least embodying herein connector means for removably connecting such at least one first elevated-supporter means and such at least one second elevated-supporter means), preferably two connections assemblies 105 (at least embodying herein at least two connectors structured and arranged to removably connect such at least one first table to at least two such at least one second tables; and at least embodying herein at least one second connector structured and arranged to removably connect such at least one first elevated-supporter and at least one second such at least one second elevated-supporter), as best shown in FIG. 1. Lowered side table 108 preferably connects to central raised table 106 at elevated support bar 145, as shown. Upon reading this specification, those with ordinary skill in the art will now appreciate that, under appropriate circumstances, considering such issues as design preference, manufacturing preferences, user preferences, cost, changing needs, etc., other connection locations may suffice.

Connection assembly 105 preferably comprises at least one male-type connector 172 and at least one female-type connector 174, as shown. Male-type connector 172 preferably is located on lowered side table 108 and female-type connector 174 preferably is located on central raised table 106, as shown. Male-type connector 172 preferably is located along bottom edge 173 of platform 157, as best shown in FIG. 3. Female-type connector 174 preferably is located on top side 146 of elevated support bar 145, as shown. Upon reading this specification, those with ordinary skill in the art will now appreciate that, under appropriate circumstances, considering such issues as design preference, manufacturing preferences, user preferences, cost, changing needs, etc., other connection arrangements, such as, for example, manual screws, butterfly screws, multiple connection positions, connectors located on different positions, other type of connectors, etc., may suffice.

Central raised table 106 and lowered side tables 108 preferably are comprised of at least one lightweight, rigid, and durable material, preferably wood. Upon reading this specification, those with ordinary skill in the art will now appreciate that, under appropriate circumstances, considering such issues as design preference, manufacturing preferences, user preferences, cost, changing needs, user needs, future technologies, etc., other materials, such as, for example, plastic, aluminum, steel, other materials, mixed materials, etc., may suffice.

The dimensions of central raised table 106 preferably will vary depending on the size of canine pet 117 and the user's preferred table size. Central raised table 106 preferably comprises a length of between about eighteen inches and about thirty inches, as shown by dimension A in FIG. 1. Central raised table 106 preferably comprises a width of between about ten inches and about twelve inches, as shown by dimension B in FIG. 1. Central raised table 106 preferably comprises a height of between about five inches and about twenty-five inches, as shown by dimension C in FIG. 1. Upon reading this specification, those with ordinary skill in the art will now appreciate that, under appropriate circumstances, considering such issues as design preference, manufacturing preferences, user preferences, cost, changing needs, user needs, pet type, etc., other widths, other lengths, other heights, etc., may suffice.

Lowered side table 108 preferably comprises a length of between about fifteen and about sixteen inches as shown by dimension D in FIG. 1. Lowered side table 108 preferably comprises a width of between about seven inches and about eight inches as shown by dimension E in FIG. 1. Upon reading this specification, those with ordinary skill in the art will now appreciate that, under appropriate circumstances, considering such issues as design preference, manufacturing preferences, user preferences, cost, changing needs, user needs, pet type, etc., other widths, other lengths, etc., may suffice.

Bowl 110 preferably comprises at least one metal material, preferably steel, preferably stainless steel. Bowl 110 preferably comprises a volume capacity of between about one quart and about three quarts. Upon reading this specification, those with ordinary skill in the art will now appreciate that, under appropriate circumstances, considering such issues as design preference, manufacturing preferences, user preferences, cost, changing needs, user needs, pet type, etc., other bowl arrangements, such as, for example, plastic bowls, other bowl materials, other bowl volume capacities, etc., may suffice.

Figures 5, 6:
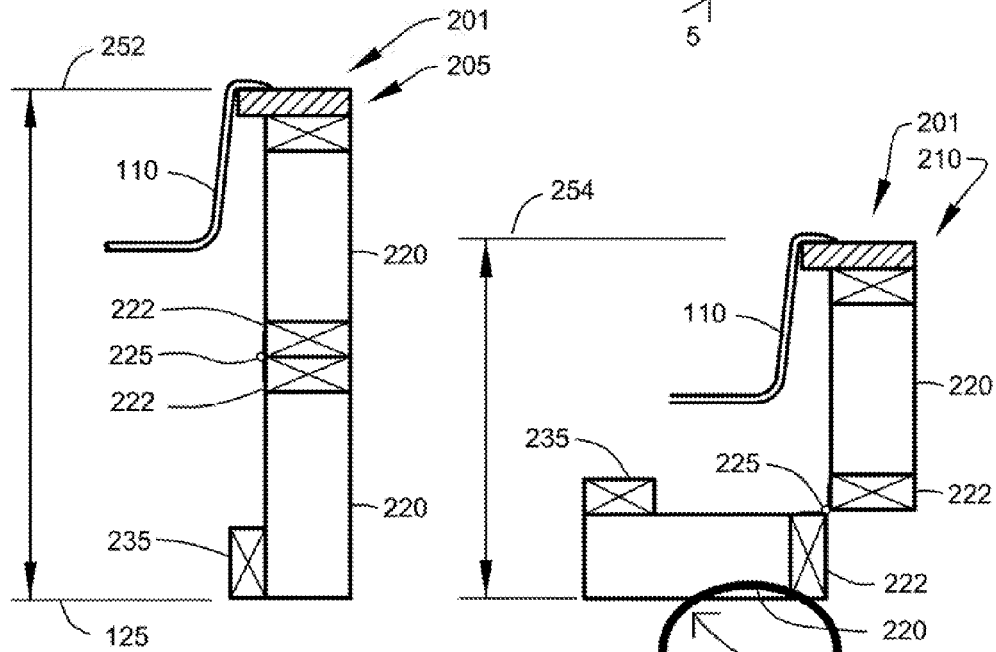
FIG. 5 shows a partial sectional view through the section 5-5 of FIG. 4, illustrating the folding nourishment table in an extended position, according to the preferred embodiment of FIG. 4.
FIG. 6 shows a partial sectional view through the section 5-5 of FIG. 4, illustrating the folding nourishment table in a folded position, according to the preferred embodiment of FIG. 4.

FIG. 4 shows an end view, illustrating folding nourishment table 201 of pet care systems 100, according to another preferred embodiment of the present invention. FIG. 5 shows a partial sectional view through the section 5-5 of FIG. 4, illustrating folding nourishment table 201 in extended position 205, according to the preferred embodiment of FIG. 4. FIG. 6 shows a partial sectional view through the section 5-5 of FIG. 4, illustrating folding nourishment table 201 in folded position 210, according to the preferred embodiment of FIG. 4.

While many features of folding nourishment table 201 are repeated from multi-unit nourishment table 101, in folding nourishment table 201 (at least embodying herein at least one elevated-supporter structured and arranged to support the at least one source of nourishment at at least one elevation above at least one horizontal support surface), table legs 220 preferably hinge between extended position 205 and folded position 210, as best shown in FIG. 5 and FIG. 6, respectively. Upon reading this specification, those with ordinary skill in the art will now appreciate that, under appropriate circumstances, considering such issues as design preference, manufacturing preferences, user preferences, cost, changing needs, etc., other table arrangements, such as, for example, multi-unit folding table arrangements, modular folding table arrangements, etc., may suffice.

In extended position 205, folding nourishment table 201 preferably supports bowls 110 at at least one higher elevated position 252 above floor surface 125, as shown in FIG. 5, in order to preferably accommodate the height of at least one taller pet 132 (see FIG. 2). In folded position 210, folding nourishment table 201 preferably supports bowls 110 at at least one lower elevated position 254 above floor surface 125, as shown in FIG. 6, in order to preferably accommodate the height of at least one shorter pet 134 (see FIG. 2). Folding nourishment table 201 preferably allows the user to adjust folding nourishment table 201 to extended position 205 or to folded position 210 depending on the height of canine pet 117. Upon reading this specification, those with ordinary skill in the art will now appreciate that, under appropriate circumstances, considering such issues as design preference, manufacturing preferences, user preferences, cost, changing needs, etc., other table folding arrangements, such as, for example, tables adjustable to more than two elevated positions, etc., may suffice.

Folding nourishment table 201 preferably is structured and arranged to support at least one bowl 110, preferably three nourishment bowls 110, as shown. Upon reading this specification, those with ordinary skill in the art will now appreciate that, under appropriate circumstances, considering such issues as design preference, manufacturing preferences, user preferences, cost, changing needs, etc., other table arrangements, such as, for example, supports for one bowl, supports for more than three bowls, etc., may suffice.

Folding nourishment table 201 preferably comprises at least one hinge bar 222, preferably two hinge bars 222, preferably with one hinge bar 222 preferably located on each end 221 of folding nourishment table 201, as shown. Folding nourishment table 201 preferably further comprises at least one support leg 220, preferably four support legs 220 (at least herein embodying wherein such at least one elevated-supporter comprises at least one stable-supporter structured and arranged to support such at least one platform at such at least one elevation; and at least herein embodying wherein such at least one stable-supporter comprises at least one support column), preferably with two support legs 220 located on each end 221, as shown. Each hinge bar 222 preferably runs perpendicular to support legs 220 and preferably connects two support legs 220, as best shown in FIG. 4. Hinge bars 222 preferably are centrally located on support legs 220, as shown. Upon reading this specification, those with ordinary skill in the art will now appreciate that, under appropriate circumstances, considering such issues as design preference, manufacturing preferences, user preferences, cost, changing needs, etc., other hinging arrangements, such as, for example, multiple hinges, different hinge locations, etc., may suffice.

Each hinge bar 222 preferably comprises at least one hinge unit 225, as best shown in FIG. 5 and FIG. 6. Hinge unit 225 (at least herein embodying wherein such at least one elevated-position-adjuster comprises at least one hinge structured and arranged to hinge between such at least one higher elevated position and such at least one lower elevated position) preferably permits hinging of support legs 220 between extended position 205 and folded position 210 in order to support bowls 110 at higher elevated position 252 or lower elevated position 254, respectively, as shown in FIG. 5 and FIG. 6. This arrangement preferably permits the user to adjust folding nourishment table 201 according to the height of canine pet 117 (this arrangement at least herein embodying wherein such at least one elevated-position-adjuster comprises at least one height-accommodator structured and arranged to accommodate the height of the at least one pet).

Folding nourishment table 201 preferably comprises at least one securing pin 230, preferably four securing pins 230, as best shown in FIG. 4. Securing pins 230 (at least embodying herein at least one locker structured and arranged to lock such at least one elevated position in such at least one higher elevated position) preferably secure folding nourishment table 201 in extended position 205, as best shown in FIG. 4. Securing pin 230 preferably is removable from folding nourishment table 201, as shown. Securing pin 230 preferably inserts in front bar 232 and hinge bar 222 in order to preferably secure folding nourishment table 201 in extended position 205, as shown. Upon reading this specification, those with ordinary skill in the art will now appreciate that, under appropriate circumstances, considering such issues as design preference, manufacturing preferences, user preferences, cost, changing needs, etc., other securing arrangements, such as, for example, manual screws, butterfly screws, other securing arrangements, etc., may suffice.

Folding nourishment table 201 preferably further comprises at least one stabilizing bar 235, as best shown in FIG. 4 and FIG. 5. Stabilizing bar 235 preferably functions to preferably balance folding nourishment table 201 in extended position 205 on floor surface 125, as best shown in FIG. 4. Upon reading this specification, those with ordinary skill in the art will now appreciate that, under appropriate circumstances, considering such issues as design preference, manufacturing preferences, user preferences, cost, changing needs, etc., other stabilizing arrangements may suffice.

An alternative embodiment of the folding nourishment table 201 comprises at least one connector 262 (at least embodying herein at least one connector structured and arranged to removably connect such at least one elevated-supporter and such at least one second elevated-supporter) in order to removably connect folding nourishment table 201 and at least one side table 250 (at least embodying herein at least one second elevated-supporter structured and arranged to support at least one second portion of the at least one source of nourishment at at least one second elevation above such at least one horizontal support surface), similar to the arrangement in multiple-unit nourishment table 101, as shown in FIG. 1. Side table 250 preferably supports at least one bowl 110 at a different elevation than folding nourishment table 201, as shown, in order to preferably accommodate of at least two canine pets 117 of at least two different heights (this arrangement at least embodying herein at least one geometry structured and arranged to geometrically position such at least one elevation at at least one different elevation than such at least one second elevation). Moreover, folding nourishment table 201 preferably assists supporting the elevation of side table 260, as shown, similar to the arrangement in multiple-unit nourishment table 101 (see FIG. 1) (this arrangement at least herein embodying wherein such at least one elevated-supporter is further structured and arranged to assist supporting such at least one second elevated-supporter at such at least one second elevation). Upon reading this specification, those with ordinary skill in the art will now appreciate that, under appropriate circumstances, considering such issues as design preference, manufacturing preferences, user preferences, cost, changing needs, etc., other side table arrangements, such as, for example, self-supporting side tables, non-removable side tables, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:
1. A system, relating to assisting feeding at least one source of nourishment to at least two pets of at least two different heights, comprising:
   a) at least one first elevated-supporter structured and arranged to support at least one first portion of the at least one source of nourishment at at least one first elevation above at least one horizontal support surface;
   b) wherein said at least one first elevated-supporter comprises at least one first elevated platform structured and arranged to hold such at least one first portion of the at least one source of nourishment;

c) wherein said at least one first elevated-supporter further comprises at least one stable-supporter structured and arranged to support said at least one first elevated platform at such at least one first elevation; and
d) wherein said at least one stable-supporter is further structured and arranged to support said at least one first elevated platform in at least one first substantially parallel position relative to such at least one horizontal support surface; and
e) at least one second elevated-supporter structured and arranged to concurrently support at least one second portion of the at least one source of nourishment at at least one second elevation above such at least one horizontal support surface;
f) wherein said at least one second elevated-supporter comprises at least one second elevated platform structured and arranged to hold such at least one second portion of the at least one source of nourishment;
g) wherein said at least one second elevated-supporter further comprises at least one first stable-support-assistor structured and arranged to assist supporting only said at least one second elevated platform at such at least one second elevation; and
h) wherein said at least one first stable-support-assistor is further structured and arranged to assist supporting only said at least one second elevated platform in at least one second substantially parallel position relative to such at least one horizontal support surface; and
i) at least one first connector structured and arranged to removably connect said at least one first elevated-supporter and said at least one second elevated-supporter;
j) wherein said at least one first elevated-supporter further comprises at least one second stable-support-assistor structured and arranged to assist supporting said at least one second elevated platform at such at least one second elevation; and
k) wherein said at least one second stable-support-assistor is further structured and arranged to assist supporting said at least one second elevated platform in such at least one second substantially parallel position; and
l) at least one geometry structured and arranged to geometrically position such at least one first elevation at at least one different elevation than such at least one second elevation;
m) wherein said system assists feeding the at least one source of nourishment to at least two pets of at least two different heights.

2. The system, according to claim 1, further comprising at least one first container structured and arranged to contain such at least one first portion of the at least one source of nourishment.

3. The system, according to claim 2, wherein said at least one first elevated platform comprises at least one first container-receiver structured and arranged to removably receive said at least one first container.

4. The system, according to claim 3, further comprising at least one second container structured and arranged to contain such at least one second portion of the at least one source of nourishment.

5. The system, according to claim 4, wherein said at least one second elevated platform comprises at least one second container-receiver structured and arranged to removably receive said at least one second container.

6. The system, according to claim 5, wherein said at least one geometry comprises at least one height-accommodator structured and arranged to accommodate the heights of at least one taller of the at least two pets and at least one shorter of the at least two pets.

7. The system, according to claim 6, wherein said at least one geometry is further structured and arranged to geometrically position such at least one first elevated platform at at least one higher elevation than such at least one second elevated platform.

8. The system, according to claim 7, wherein:
a) said at least one first elevated-supporter accommodates such at least one taller of the at least two pets; and
b) said at least one second elevated-supporter accommodates such at least one shorter of the at least two pets.

9. The system, according to claim 8, further comprising at least one second connector structured and arranged to removably connect said at least one first elevated-supporter and at least one second said at least one second elevated-supporter.

10. The system, according to claim 8, wherein said at least one stable-supporter comprises at least one first support column.

11. The system, according to claim 10, wherein said at least one first stable-support-assistor comprises at least one second support column.

12. The system, according to claim 11, wherein said at least one second stable-support-assistor comprises at least one elevated support beam.

13. The system, according to claim 12, wherein said at least one connector comprises:
a) at least one female-type connector; and
b) at least one male-type connector.

14. The system, according to claim 12, wherein:
a) said at least one first elevated-supporter comprises wood; and
b) said at least one second elevated-supporter comprises wood.

15. The system, according to claim 14, wherein:
a) said at least one first container comprises at least one second stainless steel bowl; and
b) said at least one second container comprises at least one second stainless steel bowl.

16. A system, relating to assisting feeding at least one source of nourishment to at least one pet, comprising:
a) at least one elevated-supporter structured and arranged to support the at least one source of nourishment at at least one elevation above at least one horizontal support surface;
b) wherein said at least one elevated-supporter comprises at least one platform structured and arranged to hold the at least one source of nourishment;
c) wherein said at least one elevated-supporter comprises at least one stable-supporter structured and arranged to support said at least one platform at such at least one elevation;
d) wherein said at least one stable-supporter is further structured and arranged to support said at least one platform in at least one substantially parallel position relative to such at least one horizontal support surface;
e) wherein said at least one stable-supporter comprises at least one elevated-position-adjuster structured and arranged to adjust such at least one elevated position between at least one higher elevated position and at least one lower elevated position;
f) wherein said at least one elevated-position-adjuster comprises at least one hinge structured and arranged to hinge between such at least one higher elevated position and such at least one lower elevated position; and g) wherein said system assists feeding the at least one source of nourishment to the at least one pet.

17. The system, according to claim 16, further comprising at least one container structured and arranged to contain the at least one source of nourishment.

18. The system, according to claim 17, wherein said at least one platform comprises at least one container-receiver structured and arranged to removably receive said at least one container.

19. The system, according to claim 16, further comprising at least one locker structured and arranged to lock such at least one elevated position in such at least one higher elevated position.

20. The system, according to claim 16, wherein said at least one stable-supporter comprises at least one support column.

21. The system, according to claim 20, wherein said at least one hinge is centrally-located on such at least one support column.

22. The system, according to claim 21, further comprising:
   a) at least one second elevated-supporter structured and arranged to support at least one second portion of the at least one source of nourishment at at least one second elevation above such at least one horizontal support surface;
   b) at least one connector structured and arranged to removably connect said at least one elevated-supporter and said at least one second elevated-supporter; and
   c) at least one geometry structured and arranged to geometrically position such at least one elevation at at least one different elevation than such at least one second elevation;
   d) wherein said at least one elevated-supporter is further structured and arranged to assist supporting said at least one second elevated-supporter at such at least one second elevation.

23. The system, according to claim 21, wherein said at least one elevated-position-adjuster comprises at least one height-accommodator structured and arranged to accommodate the height of the at least one pet.

24. The system, according to claim 21, wherein said at least one elevated-supporter comprises wood.

25. The system, according to claim 17, wherein said at least one container comprises at least one stainless steel bowl.

26. A system, relating to assisting feeding at least one source of nourishment to at least two pets of at least two different heights, comprising:
   a) at least two containers structured and arranged to contain the at least one source of nourishment; and
   b) at least one first table structured and arranged to support at least one first said at least two containers at at least one first elevation above at least one horizontal ground surface supporting the at least two pets;
   c) wherein said at least one first table comprises at least one first table top structured and arranged to hold such at least one first said at least two containers;
   d) wherein said at least one first table comprises at least four table legs structured and arranged to support said at least one first table top at such at least one first elevation;
   e) wherein said at least four table legs are further structured and arranged to support said at least one first table top in at least one first substantially parallel position relative to such at least one horizontal ground surface; and
   f) wherein said at least one first table top comprises at least one container-receiver structured and arranged to removably receive such at least one first said at least two containers; and
   g) at least one second table structured and arranged to support at least one second said at least two containers at at least second elevation above such at least one horizontal ground surface;
   h) wherein said at least one second table comprises at least one second table top structured and arranged to hold such at least one second said at least two containers;
   i) wherein said at least one second table comprises at least two table legs structured and arranged to assist supporting said at least one second table top at such at least one second elevated position;
   j) wherein said at least two table legs are further structured and arranged to assist supporting said at least one second table top in at least one second substantially parallel position relative to such at least one horizontal ground surface;
   k) wherein said at least one second table top comprises at least one second container-receiver structured and arranged to removably receive such at least one second said at least two containers;
   l) wherein said at least one first table comprises at least one elevated support beam structured and arranged to assist supporting said at least one second table top at such at least one second elevated position; and
   m) wherein said at least one elevated support beam is further structured and arranged to support said at least one second table top in such at least one second substantially parallel position; and
   n) at least two connectors structured and arranged to removably connect said at least one first table to at least two said at least one second tables; and
   o) at least one geometry structured and arranged to geometrically position said at least one first table top above said at least one second table top;
   p) wherein said at least one first table accommodates at least one taller of the at least two pets;
   q) wherein said at least one second table accommodates at least one shorter of the at least two pets; and
   r) wherein said system assists feeding the at least one source of nourishment to at least two pets of at least two different heights.

27. A system, relating to assisting feeding at least one source of nourishment to at least two pets of at least two different heights, comprising:
   a) first elevated-supporter means for supporting at least one first portion of the at least one source of nourishment at at least one first elevation above at least one horizontal support surface;
   b) wherein said first elevated-supporter means comprises at least one first elevated platform means for holding such at least one first portion of the at least one source of nourishment;
   c) wherein said at least one first elevated-supporter means further comprises stable-supporter means for supporting said at least one first elevated platform means at such at least one first elevation; and
   d) wherein said stable-supporter means further supports said at least one first elevated platform means in at least one first substantially parallel position relative to such at least one horizontal support surface; and
   e) second elevated-supporter means for concurrently supporting at least one second portion of the at least one source of nourishment at at least one second elevation above such at least one horizontal support surface;

f) wherein said second elevated-supporter means comprises at least one second elevated platform means for holding such at least one second portion of the at least one source of nourishment;
g) wherein said second elevated-supporter means comprises first stable-support-assistor means for assisting supporting only said at least one second elevated platform means at such at least one second elevation; and
h) wherein said first stable-support-assistor means further assists supporting only said second elevated platform means in at least one second substantially parallel position relative to such at least one horizontal support surface; and
i) connector means for removably connecting said at least one first elevated-supporter means and said at least one second elevated-supporter means;
j) wherein said first elevated-supporter means comprises second stable-support-assistor means for assisting supporting said second elevated platform means at such at least one second elevation; and
k) wherein said second stable-support-assistor means further assists supporting said second elevated platform means in such at least one second substantially parallel position; and
l) geometry means for geometrically positioning such at least one first elevation at at least one different elevation than such at least one second elevation;
m) wherein said system assists feeding the at least one source of nourishment to at least two pets of at least two different heights.

* * * * *